G. M. WILLIS.
RADIATOR AND PROCESS FOR MAKING THE SAME.
APPLICATION FILED OCT. 20, 1913.

1,243,471.

Patented Oct. 16, 1917.

Witnesses:
Leonard W. Novander.
Robert F. Brack

Inventor
George M. Willis
By Brown, Williams, Bell, Hanson & Bretcher
Attorneys

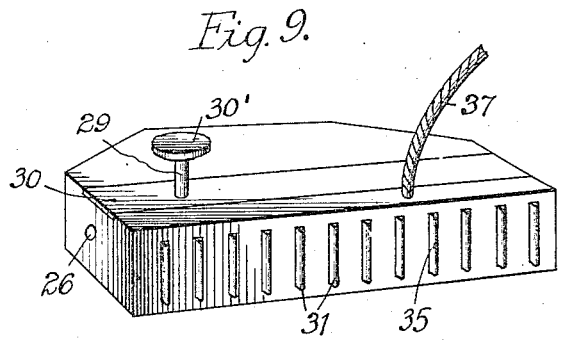
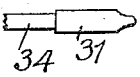
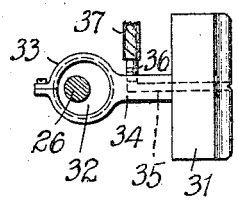
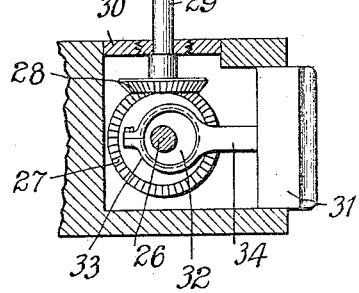
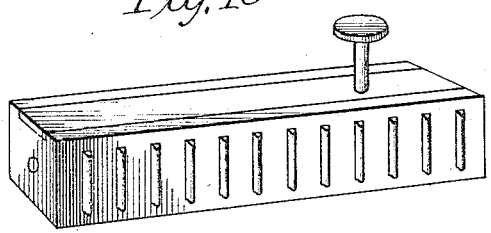
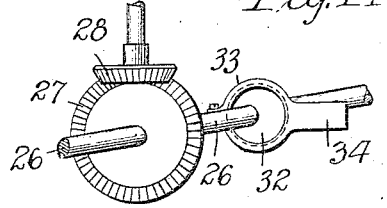
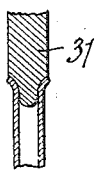

UNITED STATES PATENT OFFICE.

GEORGE M. WILLIS, OF CHICAGO, ILLINOIS, ASSIGNOR, BY DIRECT AND MESNE ASSIGNMENTS, TO CHARLES A. BROWN, HARVEY L. HANSON, AND ARTHUR H. BOETTCHER, COPARTNERS DOING BUSINESS UNDER THE FIRM-NAME OF BROWN, HANSON & BOETTCHER, OF CHICAGO, ILLINOIS.

RADIATOR AND PROCESS FOR MAKING THE SAME.

1,243,471. Specification of Letters Patent. Patented Oct. 16, 1917.

Application filed October 20, 1913. Serial No. 796,141.

*To all whom it may concern:*

Be it known that I, GEORGE M. WILLIS, a citizen of the United States, residing at Chicago, in the county of Cook and State of Illinois, have invented certain new and useful Improvements in Radiators and Processes for Making the Same, of which the following is a full, clear, concise, and exact description, reference being had to the accompanying drawings, forming a part of this specification.

My invention relates to radiators, particularly radiators adapted for association with automobile engines for the purpose of cooling the water which circulates around the engine cylinders to prevent excessive heating of the same.

My invention provides a strong and generally improved radiator structure and a process whereby a radiator may be manufactured at a comparatively low cost.

In carrying out my process I form in a die-casting machine a grid of fusible metal which externally is similar to the cellular structure forming a part of the finished radiator, the openings through the grid, however, being slightly larger than the air passages through the cellular structure for a reason presently to be made apparent. After forming the aforesaid grid, I immerse it in a suitable electrolyte and electroplate the same, preferably with copper, thus forming an integral copper shell around the fusible grid. I then place the copper-plated grid in a die-casting machine and cast a framework upon the copper shell that has been electrolytically deposited upon the fusible grid, the metal used in casting the framework being preferably one of the alloys suitable for die casting. After the radiator framework has been cast, as above set forth, I open the copper shell at the points where the water circulated through the finished radiator enters and leaves the shell, and melt the fusible alloy out of the shell.

The process of making my radiator may be varied somewhat without departing from the spirit of my invention or the scope of the appended claims.

My invention is clearly set forth in the following description in which reference is made to the accompanying drawings, in which—

Fig. 9 is a perspective view of one of the core blocks of a die-casting machine that may be employed in carrying out the process of my invention, the core block illustrated being the one employed for forming the water chamber or header in the upper portion of the radiator framework;

Fig. 10 is a similar view of a core block for forming the water chamber or header in the lower portion of the radiator framework;

Fig. 11 is an enlarged fragmentary sectional view illustrating one of the plungers with which the core block shown in Fig. 9 is provided;

Fig. 12 is an enlarged plan view of one of the plungers just referred to;

Fig. 13 is a detail view illustrating the mechanism whereby I am enabled to admit fluid under pressure to the copper shell while the framework is being cast upon the shell;

Fig. 14 is a detail view illustrating the mechanism for controlling the operation of the plungers with which the core blocks are equipped, and Fig. 15 is in enlarged fragmentary sectional view illustrating a portion of the copper shell and one of the plungers designed to project into the shell.

Figure 1:
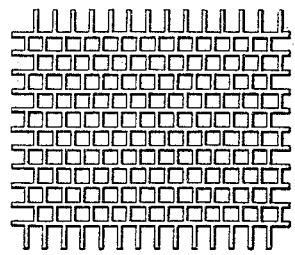
Figure 1 is a face view of the die-cast fusible grid.
Figure 2:
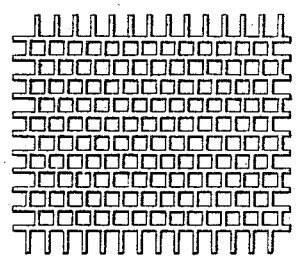
Fig. 2 is a similar view of the grid after a copper shell has been electrolytically deposited thereon.

In carrying out the process of my invention, I first die-cast a fusible metal grid of the form illustrated in Fig. 1. It is extremely important that the grid referred to be formed in a die-casting machine in order that the copper shell subsequently formed upon the grid may fit the die members of a die-casting machine when the radiator framework is cast upon the shell, as will be hereinafter explained. The metal of which the grid is formed is preferably an alloy of bismuth, antimony, etc., or metals having the same general properties in order that a copper shell may be electrolytically deposited upon the grid without there being any great tendency for the copper to become permanently associated with the grid and so prevent the fusible grid from being melted out of the shell electrolytically formed thereon.

After forming the grid illustrated in Fig. 1, I immerse it in a suitable electrolyte and electroplate the same, preferably with copper. The shell formed upon the grid may be of any desired thickness, although in practice I prefer to deposit upon the grid a copper shell having a thickness of approximately 10/1000 of an inch. In order to secure an extremely durable and watertight shell the electrolyte used in the plating operation is preferably very acid, and the depositing of the copper upon the grid should take place quite slowly. During the electroplating operation the electrolyte should be violently agitated to prevent the collection of bubbles upon the cathode which, of course, is the fusible grid.

Figure 3:
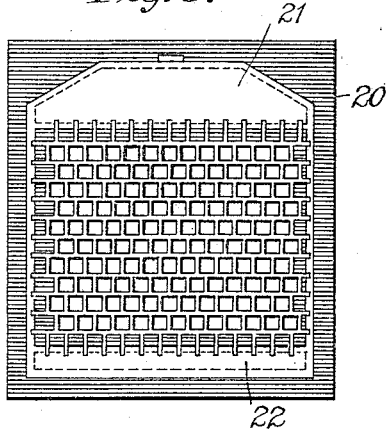
Fig. 3 illustrates the plated grid in position in a die-casting machine preparatory to casting the radiator framework upon the copper shell.

After forming the copper shell upon the fusible grid, I place the plated grid in the die 20 of a suitable die-casting machine, as is clearly illustrated in Fig. 3. At 21 and 22 in Fig. 3 I have illustrated the core blocks of the die-casting machine which are employed for forming the upper and lower water chambers or headers subsequently cast upon the copper shell. It is to be noted that the core blocks 21 and 22 are provided with suitable notches into which the upper and lower portions of the shell project when the core blocks are in the positions indicated in dotted lines in Fig. 3.

Figure 4:
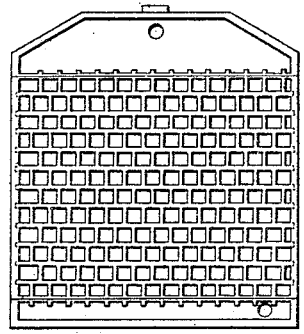
Fig. 4 shows the framework cast upon the copper shell.
Figure 6:
Fig. 6 is an edge view of the unfinished radiator illustrated in Fig. 5.

After the plated grid has been placed in the die-casting machine, as illustrated in Fig. 3, a framework is cast upon the copper shell forming a structure such as is illustrated in Fig. 4. It should be noted that the framework comprises vertical side bars in which the tubes at the lateral edges of the copper shell are embedded, transverse end bars and intermediate transverse bars through which the tubes at the upper and lower ends of the copper shell extend.

Figure 5:
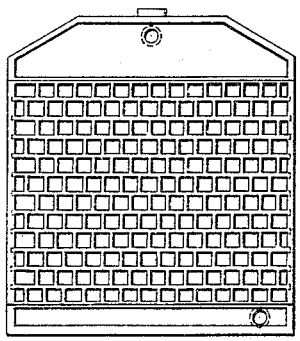
Fig. 5 illustrates the unfinished radiator after it has been subjected to the next step in the process.

The next step in the process is to shear off the portions of the shell which project through the intermediate transverse bars of the framework into the water chambers or headers, forming a structure such as is illustrated in Fig. 5. The next step in the process is to melt the fusible metal grid out of the copper shell which has been electrolytically deposited upon the grid. While I have, in describing my process, stated that the fusible metal grid is melted out of the copper shell after the framework has been cast upon the shell, it is of course apparent that the grid may be melted out of the shell before the framework is cast; in fact, in a slightly modified process for making the radiator of my invention I do melt the fusible metal out of the copper shell before the radiator framework is cast.

Figure 8:
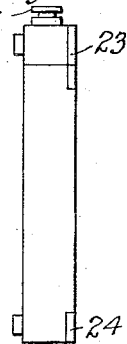
Fig. 8 is an edge view of the finished radiator shown in Fig. 7.
Figure 7:
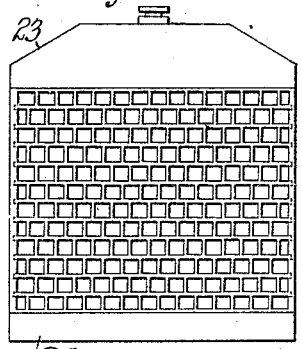
Fig. 7 is a face view of a finished radiator.

After the plates shown at 23 and 24 and the closure plug 25, all shown in Figs. 7 and 8, have been provided, the radiator of my invention is complete. I find it desirable, however, after the radiator has been finished, to copper-plate the entire radiator structure in order that the same may have a good appearance.

In carrying out a slightly modified process for making my radiator, I may employ a die-casting machine comprising core blocks of the conformation illustrated in Figs. 9 and 10, the core block shown in Fig. 9 corresponding to the core block 21 illustrated in Fig. 3, and the core block shown in Fig. 10 corresponding to the core block 22 also illustrated in dotted lines in Fig. 3. Each of the modified core blocks comprises a transverse shaft, illustrated at 26, said shaft being provided with a bevel gear 27 meshing with a bevel gear 28 fixed upon a shaft 29 disposed at right angles to the shaft 26 and bearing in a plate 30 closing an opening in the upper portion of the core block. The shafts 29 are provided with suitable hand wheels 30' for manipulating the same. Each of the core blocks is provided on its forward edge with a plurality of slots, one for each of the tubes at the ends of the copper shell formed upon the fusible grid. Movable in these slots is a plurality of plungers 31, each of which has the horizontal cross-section illustrated in Fig. 12. Fixed upon the shaft 26 of each of the core blocks is a plurality of eccentrics 32, one for each of the plungers 31, and disposed around the eccentrics 32 are the rings 33, each of which is connected by an arm 34 with one of the plungers 31. It will readily be seen, therefore, that when the shaft 26 is turned, the plungers 31 are thrust from the core blocks when the eccentrics are in the position illustrated in Fig. 11. One of the arms 34 attached to a plunger movable within the core block shown in Fig. 9 is provided with a bore 35 which leads to the forward edge of the plunger and the bore 35 is connected by means of a suitable nipple 36 with a flexible conduit 37 leading to any source of fluid under pressure.

In carrying out the slightly modified process wherein the apparatus just described is utilized, I die-cast a fusible metal grid and plate the same with copper, as before. I then open the tubes at the upper and lower edges of the copper shell and melt out the fusible metal. The hollow shell is then placed in a die-casting machine comprising core blocks of the types illustrated in Figs. 9 and 10. After the hollow shell has been so positioned, the shafts 29 of the core blocks are rotated to force the plungers 31 into the adjacent tubes of the hollow shell, thus completely closing the openings in said tubes and spreading the same somewhat, as is shown in Fig. 15, fluid under properly limited pressure is then admitted to the hollow shell through the flexible conduit 37 and the radiator framework is cast upon the hollow shell, the fluid being admitted to the hollow shell to prevent the same from collapsing due to the enormous pressure required in the casting operation. I may or may not employ the fluid under pressure, as desired.

From the foregoing description, it is seen that I have invented a process whereby I am enabled to produce a radiator comprising a shell and die-cast framework, said framework and shell constituting a homogeneous radiator structure. By this construction I am enabled to do away with the necessity for soldering or otherwise securing the copper shell and framework together.

What I claim and desire to secure by Letters Patent of the United States is:

1. The process of making a radiator which consists in forming a grid of fusible metal, electroplating said grid and casting a framework having top and bottom chambers upon the shell formed on the grid by the electroplating operation.

2. The process of making a radiator which consists in forming a grid of fusible metal, copperplating said grid and casting a framework having top and bottom chambers upon the copper shell formed on the grid by the plating operation.

3. The process of making a radiator which consists in die-casting a grid of fusible metal, electroplating said grid and die-casting a framework having top and bottom chambers upon the shell electrolytically deposited on the grid.

4. The process of making a radiator which consists in die-casting a grid of fusible material, electrolytically depositing a copper shell upon said grid and die-casting a framework having top and bottom chambers upon said shell.

5. The process of making a radiator which consists in casting a grid of fusible material, electroplating said grid, casting a framework having top and bottom chambers upon the shell electrolytically deposited upon the grid and melting the fusible material out of the shell.

6. The process of making a radiator which consists in die-casting a grid of fusible material, electroplating said grid, die-casting a framework having top and bottom chambers upon the shell electrolytically deposited upon the grid and melting the fusible material out of the shell.

7. The process of making a radiator which consists in casting a grid of fusible material, electroplating said grid, casting supporting bars upon the lateral edges of the shell electrolytically deposited upon the grid, opening the shell at top and bottom and melting the fusible material out of the shell, and casting chambers at the top and bottom of the shell.

8. The process of making a radiator which consists in die-casting a grid of fusible material, electroplating said grid, casting supporting bars upon the lateral edges of the shell electrolytically deposited upon the grid, opening the shell at top and bottom and melting the fusible material out of the shell, and casting chambers at the top and bottom of the shell.

In witness whereof, I have hereunto subscribed my name this 17th day of October A. D. 1913.

GEORGE M. WILLIS.

Witnesses:
A. G. McCaleb,
August H. Arndt.

Copies of this patent may be obtained for five cents each, by addressing the "Commissioner of Patents, Washington, D. C."